United States Patent
Nakatsugawa

(12) 
(10) Patent No.: US 6,240,104 B1
(45) Date of Patent: May 29, 2001

(54) COMMUNICATION METHOD AND COMMUNICATION SYSTEM

(75) Inventor: Yoshinori Nakatsugawa, Susono (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/099,065

(22) Filed: Jun. 16, 1998

(30) Foreign Application Priority Data

Jun. 16, 1997 (JP) .................................................. 9-158907
Aug. 1, 1997 (JP) .................................................. 9-208134

(51) Int. Cl.[7] .................................................. H04J 3/08
(52) U.S. Cl. ........................ 370/501; 370/468; 370/432
(58) Field of Search .................................. 370/230, 235, 370/236, 315, 322, 326, 341, 351, 390, 400, 404, 409, 432, 433, 437, 468, 501

(56) References Cited

U.S. PATENT DOCUMENTS

| | | | |
|---|---|---|---|
| 5,253,344 | * 10/1993 | Bostick et al. .......................... | 710/8 |
| 5,533,022 | * 7/1996 | Hiraiwa ................................. | 370/359 |
| 5,694,581 | * 12/1997 | Cheng .................................. | 395/500 |
| 6,104,727 | * 8/2000 | Moura et al. ......................... | 370/468 |
| 6,125,398 | * 9/2000 | Mirashrafi et al. ................... | 709/236 |

FOREIGN PATENT DOCUMENTS

| | | |
|---|---|---|
| 61-2448 | 1/1986 | (JP) . |
| 61-123338 | 6/1986 | (JP) . |
| 62-235842 | 10/1987 | (JP) . |
| 2-30218 | 7/1990 | (JP) . |
| 7-131487 | 5/1995 | (JP) . |
| 8-265352 | 10/1996 | (JP) . |
| 8-279819 | 10/1996 | (JP) . |

* cited by examiner

Primary Examiner—David R. Vincent
(74) Attorney, Agent, or Firm—Oblon, Spivak, McClelland, Maier & Neustadt, P.C.

(57) ABSTRACT

A path request repeating installation transmits a number of request subchannels used occupationally by communication data to be transmitted to all multiple destination repeating installations existing in paths from an originating source to destination, whereas the multiple destination repeating installations, which received the number of request subchannels from the path request repeating installation, refer to the received number of request subchannels and path information stored in path information storage circuit so as to manage the communication paths respectively.

10 Claims, 13 Drawing Sheets

FIG. 6A

PATH INFORMATION IN RH3

| | CH1 | | | | | | | | CH2 | | | | | | | | CH3 | | | | | | | |
|---|---|---|---|---|---|---|---|---|---|---|---|---|---|---|---|---|---|---|---|---|---|---|---|---|
| Rx | | | | | | | | | | | | | | | | | | | | | | | | |
| Tx | | | | | | | | | | | | | | | | | | | | | | | | |
| PATH STATE | S1 | S2 | S3 | S4 | S5 | S6 | S7 | S8 | S9 | S10 | S11 | S12 | S13 | S14 | S15 | S16 | S17 | S18 | S19 | S20 | S21 | S22 | S23 | S24 |

FIG. 6B

CONNECTED STATE

| SELF ADDRESS | N8 | | N9 | | FREE | |
|---|---|---|---|---|---|---|
| DESTINATION | N10 | | N10 | | | |
| PATH NUMBER | 5 | | 4 | | | |
| USE STATE | | | | | | |

ORIGINATING SOURCE NODE TERMINAL

| SELF ADDRESS | MUXIMUM PATH NUMBER |
|---|---|
| N7 | |
| FREE | |
| FREE | |

DESTINATION NODE TERMINAL

FIG. 8

| CH NUMBER / RH NUMBER | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|---|---|
| | | | | 1 | | | | | | | | | 2 | | | | | | | | 3 | | | | |
| 1 | Rx | 1 (1) | 1 (2) | 1 (3) | 1 (4) | 1 (5) | 1 (6) | | | | | | | 3 (1) | 3 (2) | 3 (3) | 3 (4) | | | | | | | | |
| | Tx | 1 (1) | 1 (2) | 1 (3) | 1 (4) | 1 (5) | 1 (6) | | | | | | | 3 (1) | 3 (2) | 3 (3) | 3 (4) | | | | | | | | |
| 2 | Rx | 1 (1) | 1 (2) | 1 (3) | 1 (4) | 1 (5) | 1 (6) | | | | | | | 3 (1) | 3 (2) | 3 (3) | 3 (4) | | | | | | | | |
| | Tx | 1 (1) | 1 (2) | 1 (3) | 1 (4) | 1 (5) | 1 (6) | 2 (1) | 2 (2) | 2 (3) | 2 (4) | 2 (5) | 2 (6) | 3 (1) | 3 (2) | 3 (3) | 3 (4) | | | | | | | | |
| 3 | Rx | 1 (1) | 1 (2) | 1 (3) | 1 (4) | 1 (5) | 1 (6) | 2 (1) | 2 (2) | 2 (3) | 2 (4) | 2 (5) | 2 (6) | 3 (1) | 3 (2) | 3 (3) | 3 (4) | | | | | | | | |
| | Tx | 1 (1) | 1 (2) | 1 (3) | 1 (4) | 1 (5) | 1 (6) | 2 (1) | 2 (2) | 2 (3) | 2 (4) | 2 (5) | 2 (6) | | | | | | | | | | | | |
| 4 | Rx | 1 (1) | 1 (2) | 1 (3) | 1 (4) | 1 (5) | 1 (6) | 2 (1) | 2 (2) | 2 (3) | 2 (4) | 2 (5) | 2 (6) | | | | | | | | | | | | |
| | Tx | 1 (1) | 1 (2) | 1 (3) | 1 (4) | 1 (5) | 1 (6) | 2 (1) | 2 (2) | 2 (3) | 2 (4) | 2 (5) | 2 (6) | | | | | | | | | | | | |
| 5 | Rx | | | | | | | 2 (1) | 2 (2) | 2 (3) | 2 (4) | 2 (5) | 2 (6) | 3 (1) | 3 (2) | 3 (3) | 3 (4) | | | | | | | | |
| | Tx | | | | | | | | | | | | | | | | | | | | | | | | |

FIG. 10

| CH NUMBER / RH NUMBER | | 1 | | | | | | | | 2 | | | | | | | | 3 | | | | | | | |
|---|---|---|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| 1 | Rx | 1 | 1 | 1 | 1 | 1 | 1 | | | | | | | 3 | 3 | 3 | 3 | | | | | | | | |
| | Tx | 1 | 1 | 1 | 1 | 1 | 1 | | | | | | | 3 | 3 | 3 | 3 | | | | | | | | |
| 2 | Rx | 1 | 1 | 1 | 1 | 1 | 1 | | | | | | | 3 | 3 | 3 | 3 | | | | | | | | |
| | Tx | 1 | 1 | 1 | 1 | 1 | 1 | | | | | | | 3 | 3 | 3 | 3 | | | | | | | | |
| 3 | Rx | 1 | 1 | 1 | 1 | 1 | 1 | | | | | | | 3 | 3 | 3 | 3 | | | | | | | | |
| | Tx | 1 | 1 | 1 | 1 | 1 | 1 | | | | | | | 3 | 3 | 3 | 3 | | | | | | | | |
| 4 | Rx | 1 | 1 | 1 | 1 | 1 | 1 | | | | | | | 4 | 4 | 4 | 4 | 5 | 5 | 5 | 5 | | | | |
| | Tx | 1 | 1 | 1 | 1 | 1 | 1 | | | | | | | 4 | 4 | 4 | 4 | 5 | 5 | 5 | 5 | | | | |
| 5 | Rx | 1 | 1 | 1 | 1 | 1 | 1 | | | | | | | | | | | | | | | | | | |
| | Tx | 1 | 1 | 1 | 1 | 1 | 1 | | | | | | | 3 | 3 | 3 | 3 | | | | | | | | |

FIG. 12

| CH NUMBER \ RH NUMBER | | 1 | | | | | | | | 2 | | | | | | | | 3 | | | | | | | |
|---|---|---|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
| 1 | Rx | | | | | | | | | | | | | 3 | 3 | 3 | 3 | | | | | | | | |
| | Tx | 6 | 6 | 6 | 6 | 6 | 6 | | | | | | | 3 | 3 | 3 | 3 | | | | | | | | |
| 2 | Rx | 6 | 6 | 6 | 6 | 6 | 6 | | | | | | | 3 | 3 | 3 | 3 | | | | | | | | |
| | Tx | 6 | 6 | 6 | 6 | 6 | 6 | 7 | 7 | 7 | 7 | 7 | 7 | 3 | 3 | 3 | 3 | | | | | | | | |
| 3 | Rx | 6 | 6 | 6 | 6 | 6 | 6 | 7 | 7 | 7 | 7 | 7 | 7 | 3 | 3 | 3 | 3 | | | | | | | | |
| | Tx | 6 | 6 | 6 | 6 | 6 | 6 | 7 | 7 | 7 | 7 | 7 | 7 | 3 | 3 | 3 | 3 | | | | | | | | |
| 4 | Rx | 6 | 6 | 6 | 6 | 6 | 6 | 7 | 7 | 7 | 7 | 7 | 7 | 4 | 4 | 4 | 4 | 5 | 5 | 5 | 5 | | | | |
| | Tx | 6 | 6 | 6 | 6 | 6 | 6 | 7 | 7 | 7 | 7 | 7 | 7 | 4 | 4 | 4 | 4 | 5 | 5 | 5 | 5 | | | | |
| 5 | Rx | 6 | 6 | 6 | 6 | 6 | 6 | | | | | | | | | | | 5 | 5 | 5 | 5 | | | | |
| | Tx | | | | | | | | | | | | | 3 | 3 | 3 | 3 | | | | | | | | |

FIG. 13

| PATH REQUEST RH NUMBER | ORIGINATING SOURCE N NUMBER | DESTINATION N NUMBER | PATH NUMBER | USE / FREE STATE |
|---|---|---|---|---|
| 1 | N3 | N15 | 1 | |
| 2 | N6 | N14 | 2 | |
| 5 | N13 | N7 | 3 | |
| 3 | N9 | N10 | 4 | |
| 3 | N8 | N10 | 5 | |
| 1 | N3 | N14 | 6 | |
| 2 | N6 | N15 | 7 | |
| — | — | — | — | — |
| — | — | — | — | — |
| — | — | — | — | — |

COMMUNICATION METHOD AND COMMUNICATION SYSTEM

BACKGROUND OF THE INVENTION

1. Field of the Invention

The present invention relates to a communication system which is arranged by connecting plural repeating installations connected with one or more node terminals via a data transmission line and exchange data between the node terminals, between the repeating installations or between the node terminals and repeating installations, more specifically, for example, relates to a communication method and communication system which can securely transmit communication data from an originating source node terminal to a specified destination node terminal without reducing a data transmission amount per unit time.

2. Description of the Related Art

A communication system, which is arranged such that plural repeating installations respectively connected with one or more node terminals are connected with each other via a data transmission line and exchanges data between the node terminals, between the repeating installations or between the node terminals and repeating installations, has been generally known.

In the aforementioned conventional communication system, as communication path management which is used when communication data are transmitted from an originating source node terminal to a destination node terminal, for example, central managing method using a central managing device is generally adopted.

As for the central managing method, the central managing device connected with the communication system always monitors use/free state of plural data channels provided respectively to the repeating installations. At this time, for example, when a certain node terminal connected with a certain repeating installation makes a request of transmission of communication data, accordingly the repeating installation sends use request of data channels to the central managing device. The central managing device successively searches plural communication paths from an originating source node terminal to a destination node terminal for data channels in free state or in free-enabled state, and allocates the searched data channel to the repeating installation sending use request. As a result, communication paths from the originating source node terminal to the destination node terminal are secured, and communication data can be transmitted securely from the originating source node terminal to the destination node terminal along the communication paths.

However, according to the aforementioned central managing method of managing communication paths in the conventional communication system, for example, in the case where data are exchanged between the node terminals, every time a certain node terminal connected with a certain repeating installation make a request of transmission of communication data, the repeating installation connected with this node terminal transmits use request of data channels to the central managing device. Accordingly the central managing device successively searches plural communication paths from the originating node terminal to the destination node terminal for data channels in free state or in free-enabled state, and allocates the searched data channels to the repeating installation which made use request. Since the central managing device should perform such a complicated process, time required for securing the usable communication paths becomes comparatively longer. Therefore, there arises a problem to be solved such that it is difficult to increase a data transmission amount per unit time in the communication system.

SUMMARY OF THE INVENTION

The present invention has been achieved with such points in view. It therefore is an object of the present invention to provide a communication method and communication system which can transmit communication data from an originating source node terminal to a specified destination node terminal securely without reducing a data transmission amount per unit time even in the case where data are exchanged between node terminals belonging respectively to different repeating installations by reducing load due to path management in the respecting repeating installations and by shortening processing time required for the path management in the respective repeating installations.

To achieve the object, a first aspect of the invention provides a communication method which is used in a communication system arranged by connecting plural repeating installations, to which one or more node terminals are connected, via a data transmission line, when data are exchanged between the node terminals, between the repeating installations or between the node terminals and repeating installations, the communication method comprising the steps of:

providing the plural repeating installations with plural subchannels which become paths for communication data received/transmitted from/to the respective repeating installations and path information storage circuit for storing path information relating to paths from an originating source to destination per subchannel;

transmitting, from a repeating installation in the plural repeating installations, which becomes a path request repeating installation when request of transmission of communication data is made to a prescribed destination in one of the repeating installation itself or a node terminal connected with the repeating installation itself, a number of request subchannels which are used occupationally by the communication data to be transmitted to all multiple destination repeating installations existing in paths from the originating source to destination in multiple way; and referring, in the respective multiple destination repeating installations which received the number of request subchannels from the path request repeating installation, to the received number of request subchannels and the path information stored in the path information storage circuit to manage respective communication paths respectively.

According to the first aspect, the the path request repeating installation transmits a number of request subchannels which are used occupationally by the communication data to be transmitted to all multiple destination repeating installations existing in paths from the originating source to destination in multiple way, whereas the the respective multiple destination repeating installations, which received the number of request subchannels from the path request repeating installation, refer to the received number of request subchannels and the path information stored in the path information storage measure so as to manage respective communication paths respectively. Therefore, load due to the path management in the respective repeating installations is reduced, and processing time required for the path management in the repeating installations is shortened. As a result, for example, in the case where data are exchanged between the node terminals belonging respectively to different repeating installations, the communication data can be transmitted from the originating source node terminal to the specified destination node terminal securely without reducing a data transmission amount per unit time.

A second aspect of the present invention provide a communication method according to claim 1, further comprising the steps of:

judging, in the respective multiple destination repeating installations which received the number of request subchannels from the path request repeating installation, as to whether or not a requested number of subchannels can be prepared with referring to the received number of request subchannels and the path information stored in the path information storage circuit; and returning a result of a preparation YES/NO judgment from the respective multiple destination repeating installations to the path request repeating installation.

According to the second aspect, the respective multiple destination repeating installations, which received the number of request subchannels from the path request repeating installation refer to the received number of request subchannels and the path information stored in the path information storage measure so as to judge as to whether or not a requested number of subchannels can be prepared, and return the result of the preparation YES/NO judgment to the path request repeating installation.

Further, a third aspect of the present invention provides a communication method according to claim 1, further comprising the steps of:

judging, in the respective multiple destination repeating installations which received the number of request subchannels from the path request repeating installation, as to whether or not a requested number of subchannels can be prepared with referring to the received number of request subchannels and the path information stored in the path information storage circuit; and returning a state that subchannels cannot be prepared to the path request repeating installation when a judgment is made that a requested number of subchannels cannot be prepared as a result of the preparation YES/NO judgment.

According to the third aspect, the respective multiple destination repeating installations, which received the number of request subchannels from the path request repeating installation refer to the received number of request subchannels and the path information stored in the path information storage measure so as to judge as to whether or not a requested number of subchannels can be prepared, and when the judgment is made that a requested number of subchannels cannot be prepared as the result of the preparation YES/NO judgment, return the state that subchannels cannot be prepared to the path request repeating installation. Therefore, the path request repeating installation, which received the state that subchannels cannot be prepared, can grasp all that the preparation impossible states in each multiple destination repeating installation.

Furthermore, a fourth aspect of the present invention provides a communication method which is used in a communication system arranged by connecting plural repeating installations, to which one or more node terminals are connected, via a data transmission line, when data are exchanged between the node terminals, between the repeating installations or between the node terminals and repeating installations, the communication method comprising the steps of:

providing the plural repeating installations with plural subchannels which become paths for communication data received/transmitted from/to the respective repeating installations, and path information storage circuit for storing path information which comprises use/free state of the subchannels, path numbers to which eigenvalues are given for communication data whose sources are the same in order to be able to discriminate communication data whose sources are different from each other and maximum path number which is one of the path numbers in use in the communication system obtains a maximum value;

transmitting, from a repeating installation in the plural repeating installations, which becomes a path request repeating installation when request of transmission of communication data is made to a prescribed destination in one of the repeating installation itself or a node terminal connected with the repeating installation itself, a number of request subchannels which are used occupationally by the communication data to be transmitted to all multiple destination repeating installations existing in paths from an originating source to destination in multiple way;

judging, in the respective multiple destination repeating installations which received the number of request subchannels from the path request repeating installation, as to whether or not the requested number of subchannels can be prepared with referring to the received number of request subchannels and the path information stored in the path information storage circuit;

returning an effect that the preparation for receiving the communication data is completed to the path request repeating installation when a judgment is made that the requested number of subchannels can be prepared as a result of a preparation YES/NO judgment; and transmitting, from the path request repeating installation which received an effect that a preparation for receiving the communication data is completed from all the multiple destination repeating installations, declaration to use a new path number obtained by performing prescribed operation on a maximum path number stored in the path information storage circuit to at least all the multiple destination repeating installations in multiple way.

According to the fourth aspect, the path request repeating installation transmits a number of request subchannels which are used occupationally by the communication data to be transmitted t all multiple destination repeating installations existing in paths from the originating source to destination in multiple way, whereas the respective multiple destination repeating installations, which received the number of request subchannels from the path request repeating installation refer to the received number of request subchannels and the path information stored in the path information storage measure so as to judge as to whether or not the requested number of subchannels can be prepared, and when the judgment is made that the requested number of subchannels can be prepared as the result of the preparation YES/NO judgment, return the effect that the preparation for receiving the communication data is completed to the path request repeating installation. Then, the path request repeating installation, which received the effect that the preparation for receiving the communication data is completed from all the multiple destination repeating installations, transmits declaration to use a new path number obtained by performing prescribed operation on the maximum path number stored in the path information storage measure to at least all the multiple destination repeating installations in multiple way.

Accordingly, paths for the communication data from the originating source to destination with use-declared new path number can be secured, and path numbers, which are eigenvalues for respective communication data whose source is the same, are given to the secured communication paths in order to be able to discriminate the communication data whose sources are different from each other. Therefore, transferring per communication path, starting-up, stopping, etc. are simplified per path number, and as a result, easiness and expandability of the path management can be improved greatly.

Further, a fifth aspect of the present invention provides a communication method according to claim 4, further comprising the step of:

rewriting and updating, in the respective multiple destination repeating installations which received a new path number use declaration from the path request repeating installation, a maximum path number stored in the path information storage circuit into the received new path number.

According to the fifth aspect, the respective multiple destination repeating installations, which received the new path number use declaration from the path request repeating installation, rewrite and update the maximum path number stored in the path information storage measure into the received new path number.

In addition, a sixth aspect of the present invention provides a communication system comprising plural repeating installations, to which one or more node terminals are connected, connected via a data transmission line, the communication system exchanging data between the node terminals, between the repeating installations or between the node terminals and repeating installations, the plural repeating installations comprising:

plural subchannels which become paths for communication data received/transmitted from/to the respective repeating installations; and a path information storage circuit for storing path information relating to paths from an originating source to destination per subchannel;

a repeating installation in the plural repeating installations, which becomes a path request repeating installation when request of transmission of communication data is made to a prescribed destination in one of the repeating installation itself or a node terminal connected with the repeating installation itself: comprising a request subchannel number multiple transmission circuit for transmitting a number of request subchannels which are used occupationally by the communication data to be transmitted to all multiple destination repeating installations existing in paths from an originating source to destination in multiple way;

the respective multiple destination repeating installations which received the number of request subchannels from the path request repeating installation: comprising a path control circuit for referring to the received number of request subchannels and the path information stored in the path information storage circuit so as to manage respective communication paths respectively.

According to the sixth aspect, the request subchannel number multiple transmission measure of the path request repeating installation transmits a number of request subchannels which are used occupationally by the communication data to be transmitted to all multiple destination repeating installations existing in paths from the originating source to destination in multiple way, whereas a path control measure, which is provided respectively to the respective multiple destination repeating installations which received the number of request subchannels from the path request repeating installation, refers to the received number of request subchannels and the path information stored in the path information storage measure so as to manage respective communication paths respectively. Therefore, processing load due to the path management in the repeating installations is reduced, and processing time required for the path management in the repeating,installation is shortened. As a result, for example, in the case where data are exchanged between the node terminals belonging respectively to different repeating installations, the communication data can be transmitted from the originating source node terminal to the specified destination node terminal securely without reducing a data transmission amount per unit time.

Further, a seventh aspect of the present invention provides a communication system according to claim 6, wherein the path control circuit judges as to whether or not the requested number of subchannels can be prepared with referring to the received number of request subchannels and path information stored in the path information storage circuit, and returns a result of a preparation YES/NO judgment to the path request repeating installation.

According to the seventh aspect, the path control measure, which is provided respectively to the multiple destination repeating installations which received the number of request subchannels from the path request repeating installation, refers to the received number of request subchannels and path information stored in the path information storage measure so as to judge as to whether or not the requested number of subchannels can be prepared, and returns the result of the preparation YES/NO judgment to the path request repeating installation.

Furthermore, an eighth aspect of the present invention provides a communication system according to claim 6, wherein the path control circuit judges as to whether or not the requested number of subchannels can be prepared with referring to the received number of request subchannels and path information stored in the path information storage circuit, and returns a preparation impossible condition to the path request repeating installation when a judgment is made that the requested number of subchannels cannot be prepared as a result of a preparation YES/NO judgment.

According to the eighth aspect, the path control measure, which is provided respectively to the multiple destination repeating installations received the number of request subchannels from the path request repeating installation, refers to the received number of request subchannels and path information stored in the path information storage measure so as to judge as to whether or not the requested number of subchannels can be prepared, and when the judgment is made that the requested number of subchannels cannot be prepared as the result of the preparation YES/NO judgment, returns the preparation impossible condition to the path request repeating installation. Therefore, the path request repeating installation received the preparation impossible condition can grasp all the preparation impossible conditions in the respective multiple destination repeating installations.

Furthermore, a ninth aspect of the present invention provides a communication system comprising plural repeating installations, to which one or more node terminals are connected, connected via a data transmission line, the communication system exchanging data between the node terminals, between the repeating installations or between the node terminals and repeating installations, the plural repeating installations comprising:

plural subchannels which become paths for communication data received/transmitted from/to the respective repeating installations; and a path information storage circuit for storing path information which comprises use/free state of the subchannels, path numbers to which eigenvalues are given for communication data whose sources are the same in order to be able to discriminate communication data whose sources are different from each other and maximum path number which is one of the path numbers in use in the communication system obtains a maximum value;

a repeating installation in the plural repeating installations, which becomes a path request repeating installation when request of transmission of communication data is made to a prescribed destination in one of the repeating installation itself or a node terminal connected with the repeating installation itself: comprising a request subchannel number multiple transmission circuit for transmitting a number of request subchannels which are used occupationally by the communication data to be transmitted to all multiple destination repeating installations existing in paths from an originating source to destination in multiple way;

the respective multiple destination repeating installations which received the number of request subchannels from the path request repeating installation, comprising:

a path control circuit for referring to the received number of request subchannels and the path information stored in the path information storage circuit so as to judge as to whether or not the requested number of subchannels can be prepared and when the judgment is made that the requested number of subchannels can be prepared as a result of a preparation YES/NO judgment, returning the effect that the preparation for receiving the communication data is completed to the path request repeating installation;

the path request repeating installation which received an effect that a preparation for receiving the communication data is completed from all the multiple destination repeating installations, comprising:

a use declaration multiple transmission circuit for transmitting declaration to use a new path number obtained by performing prescribed operation on a maximum path number stored in the path information storage circuit to at least all the multiple destination repeating installations in multiple way.

According to the ninth aspect, the request subchannel number multiple transmission measure of the path request repeating installation transmits a number of request subchannels which are used occupationally by the communication data to be transmitted to all multiple destination repeating installations existing in paths from the originating source to destination in multiple way, whereas the path control measure, which is provided respectively in the respective multiple destination repeating installations, which received the number of request subchannels from the path request repeating installation, refers to the received number of request subchannels and the path information stored in the path information storage measure so as to judge as to whether or not the requested number of subchannels can be prepared and when the judgment is made that the requested number of subchannels can be prepared as the result of the preparation YES/NO judgment, returning the effect that the preparation for receiving the communication data is completed to the path request repeating installation. Then, the use declaration multiple transmission measure in the path request repeating installation, which received the effect that the preparation for receiving the communication data is completed from all the multiple destination repeating installations, transmits declaration to use a new path number obtained by performing prescribed operation on the maximum path number stored in the path information storage measure to at least all the multiple destination repeating installations in multiple way.

Accordingly, paths for the communication data from the originating source to destination with use-declared new path number can be secured, and path numbers, which are eigenvalues for respective communication data whose source is the same, are given to the secured communication paths in order to be able to discriminate the communication data whose sources are different from each other. Therefore, transferring per communication path, starting-up, stopping, etc. are simplified per path number, and as a result, easiness and expandability of the path management can be improved greatly.

A tenth aspect of the present invention provides a communication system according to claim 9, wherein the multiple destination repeating installations which received the new path number use declaration from the path request repeating installation, comprises a path number rewriting/updating circuit for rewriting and updating a maximum path number stored in the path information storage circuit into the received new path number.

According to the tenth aspect, the path number rewriting/updating measure, which is provided respectively in the multiple destination repeating installations which received the new path number use declaration from the path request repeating installation, rewrites and updates the maximum path number stored in the path information storage measure into the received new path number.

BRIEF DESCRIPTION OF THE DRAWINGS

FIG. 6A is a state transition diagram showing a path connected state between an originating source and destination for plural groups of communication data.

FIG. 6B is a state transmission diagram showing a path state of subchannels in the respective route hubs RH in the path connected state.

FIG. 8 is a state transition diagram showing a path connected state between the originating source and destination for plural groups of communication data and path state of subchannels in the respective route hubs RH in the path connected state.

FIG. 10 is a state transition diagram showing a path connected state between the originating source and destination for plural groups of communication data and path state of subchannels in the respective route hubs RH in the path connected state.

FIG. 12 is a state transition diagram showing a path connected state between the originating source and destination for plural groups of communication data and path state of subchannels in the respective route hubs RH in the path connected state.

FIG. 13 is a drawing showing path numbers given to paths in the respective route hubs RH in the order of path request.

DETAILED DESCRIPTION OF THE PREFERRED EMBODIMENTS

The following describes in detail one embodiment of a communication method and communication system according to the present invention on reference to the drawings.

Figure 2:
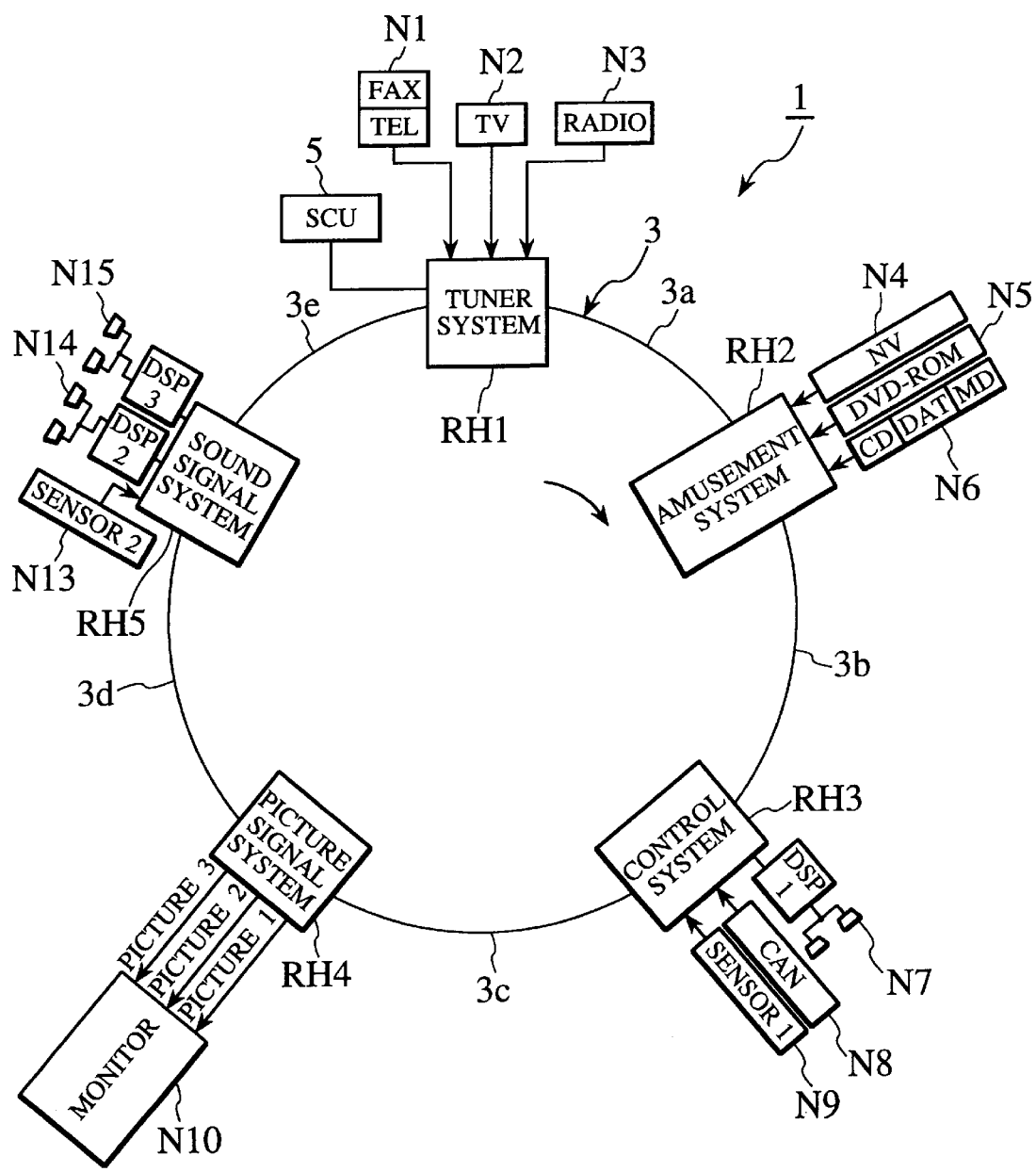
FIG. 2 is a schematic block constitutional diagram showing the whole communication system.
Figure 3:
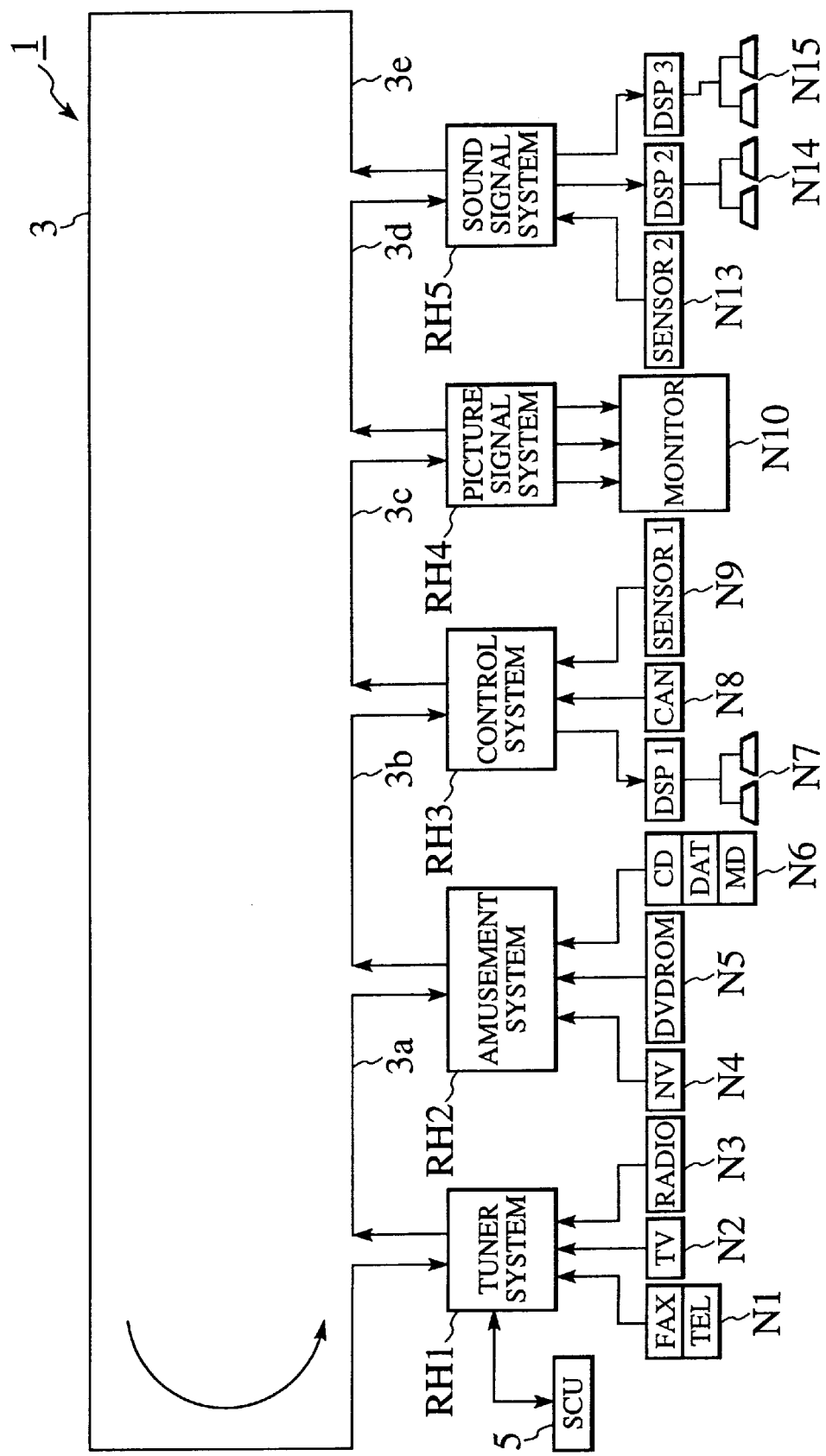
FIG. 3 is a schematic block constitutional diagram showing the whole communication system.

First, as shown in FIG. 2 or 3, a communication system 1 of the present invention is arranged such that plural route hubs RH1, RH2, RH3, RH4 and RH5 as repeating installations are connected via loop-formed data transmission lines 3 so that data can be exchanged therebetween. The route hub RH1 is connected with respective route hubs RH composing synchronous control in the whole communication system 1 and composing the communication system 1, and with a system control unit (SCU) 5 for generally managing an address setting operation, etc. of respective functional equipments N, mentioned later. Here, as network topology of the communication system 1, besides the aforementioned loop form, for example, suitable forms such as bus form and star form can be adopted.

Figure 1:
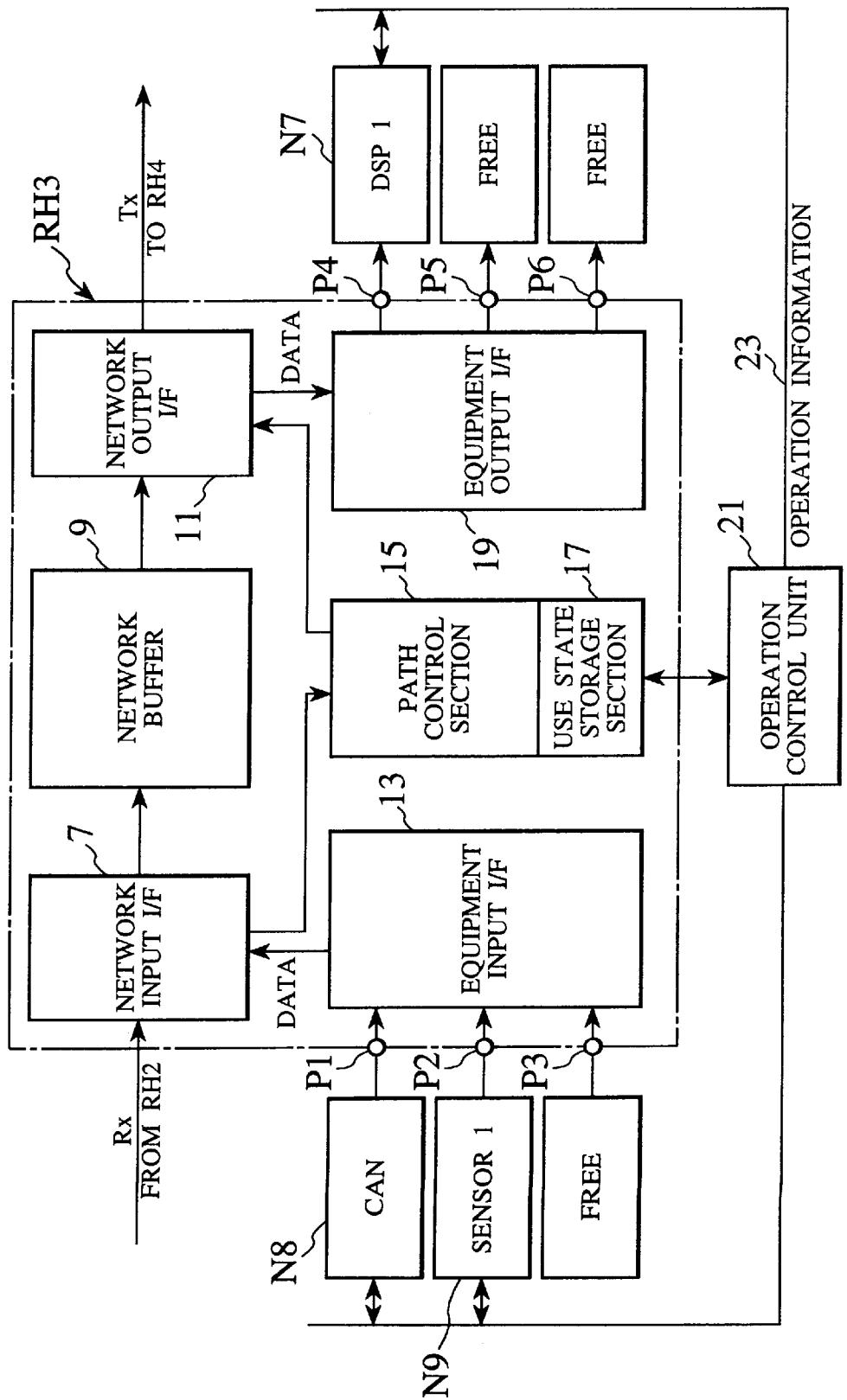
FIG. 1 is a block constitutional diagram of a route hub RH to be a main section of a communication system of the present invention.

The plural route hubs RH are connected respectively with one or more various functional equipments N1 through N15 as node terminals, and thus data can be exchanged between the route hubs RH, between the functional equipments N or between the functional equipments N and route hubs RH via the data transmission lines 3 which permits communication data to be transmitted to a direction of an arrow in FIG. 1, for example.

Examples of the functional equipments N which can be adopted are a portable telephone, facsimile (FAX), digital TV, radio receiver, navigation unit (NV), vehicle-borne receiver (VICS) which receives vehicle information provided from a Vehicle Information and Communication System, a vehicle-borne communication device (ETC) which communicates toll information with an Electrical Toll Collection System for collecting toll of a toll road automatically, DVD (Digital Video Disc)-ROM unit, CD (Compact Disc)-ROM unit, DAT (Digital Audio Tape recorder), MD (mini Disc), audio amplifier containing a digital signal processor (DSP), CAN (Controller Area Network) interface, various sensors such as a bearing sensor and car speed sensor, monitor unit and vehicle-borne personal computer.

The plural route hubs RH are divided per functional unit into a tuner system for inputting a radio wave from a facsimile (FAX), portable telephone, etc. and a broadcasting radio wave from a digital TV or radio receiver from the functional equipments N, an amusement system for inputting a sound signal and picture signal, information about traffic jam from the functional equipments N such as a navigation device (NV), a control system for inputting control information, etc. from the functional equipments N such as various sensors, a picture signal system for outputting a picture signal to a monitor unit, etc., and a sound signal system for outputting a sound signal to an audio amplifier, etc. containing a digital signal processor (DSP).

Inherent addresses are previously set respectively in the plural route hubs RH and functional equipments N by an address setting operation, for example, by the system control unit (SCU) 5 when the communication system 1 is turned on so that they can be discriminated from each other. These addresses are used for specifying a destination or originating source in the case where data are exchanged between the route hubs RH, between the functional equipments N or between the functional equipments N and route hubs RH via the data transmission line 3. In the example of FIG. 1, inherent self addresses are set respectively in the plural route hubs RH1, RH2, RH3, RH4 and RH5, whereas inherent self addresses are set respectively in the plural functional equipments N1, N2, N3, . . . , N15.

The following describes a block arrangement in the route hubs RH as repeating installations by typically exemplifying the route hub RH3 on reference to FIG. 1. The route hub RH3 is arranged so as to include a network input interface (hereinafter, "interface" is abbreviated as "I/F") 7, a network buffer 9, a network output I/F 11, an equipment input I/F 13, a path control section 15, a path information storage section 17 and an equipment output I/F 19. Here, the path control section 15 is connected with the various functional equipments N7, N8 and N9 connected with the route hub RH3 via a communication line 23, and is connected with an operation control unit 21 which always monitors and inputs operation information relating to operating states of the various functional equipments N7, N8 and N9 so as to transmit the inputted operation information to the path control section 15, whereas inputs the operation information of the various functional equipments N7, N8 and N9 transmitted from the path control section 15 so as to distribute and transmit the inputted operation information to the various functional equipments N7, N8 and N9.

The network input I/F 7 inputs various instructions and operation information of the functional equipments N, or communication data including source data, etc. or communication data transmitted from the equipment input I/F 13, mentioned later, which are transmitted from the route hub RH2 positioned on the upper stream side via a data transmission line 3b, and distributes and outputs the inputted communication data to a suitable transmission destination.

The network buffer 9 temporarily stores the communication data inputted via the network input I/F 7.

The network output I/F 11 transmits the communication data transmitted from the network buffer 9 or path control section 15 to the route hub RH4 positioned on the lower stream side via a data transmission line 3c.

The equipment input I/F 13 has first through third input ports P1, P2 and P3, and it inputs the communication data transmitted from the functional equipments N8 and N9 connected with the equipment input I/F 13 via the first through third input ports P1, P2 and P3, performs suitable converting process on the inputted communication data so as to transmit the converted communication data to the network input I/F 7.

The path information storage section 17 suitably refers to the operation information of the various functional equipments N7, N8 and N9 inputted from the operation control unit 21 and at the same time always updates path information, mentioned later, to be in the latest state so as to store the path information. The path information of the route hub RH3 stored in the path information storage section 17, as shown in FIGS. 6A and 6B, comprises use/free states of twenty-four subchannels S1 through S24, path numbers and maximum path number. The subchannels S1 through S24 are allocated every time when the communication data inputted/outputted into/from the route hub RH3 are received (Rx)/transmitted (Tx) and which are composed by dividing three channels CH1, CH2 and CH3 respectively into eight, for example. When subchannels in use state exist, the path numbers are described in a subchannel area in use state and eigenvalues are given to paths for respective the communication data which are transmitted from the same sources so that the communication data from different places can be discriminated from each other. The maximum path number is a maximum value of the path numbers being used in the communication system 1.

The path control section 15 comprises:

a request subchannel number transmitting function for when the route hub RH3 or one of the functional equipments N8 and N9 to be an originating source node terminal in the various functional equipments N7, N8 and N9 connected with route hub RH3 requests transmission of communication data to a prescribed destination, transmitting a number of request subchannels, which are used for the transmission of the communication data transmitted in multiple way to all the route hubs RH existing in paths from an originating source to a destination, to the network output I/F 11;

a new path number use declaring function for when receiving a response such that a requested number of subchannels can be prepared from all the multiple destinations, transmitting use declaration of a new path number obtained by performing a prescribed operation on the maximum path number stored in the path information storage section 17 which is transmitted to all the route hubs RH existing in the paths from the originating source to destination in multiple way, more specifically, the new path number obtained by increasing the maximum path number by a prescribed value such as "1";

a preparation YES/NO judging function for when receiving multiple communication data including a request number of subchannels from the route hub RH2 positioned on the upper stream side via the network input I/F 7, referring to self path information stored in the path information storage section 17 so as to judge as to whether or not the route hub RH3 can prepare a requested number of subchannels;

a self path information transmitting function for when as the result of the preparation YES/NO judgment, the judgment is made that the route hub RH3 cannot prepare a requested number of subchannels, transmitting the self path information of the route hub RH3 to be transmitted to an originating source of the multiple communication data to the network output I/F 11;

a receiving preparation completion transmitting function for when as the result of the preparation YES/NO judgment, the judgment is made that the route hub RH3 can prepare a requested number of subchannels, or when after the judgment is made that the route hub RH3 cannot prepare a requested number of subchannels, subchannels become free, transmitting the completion of preparation for receiving the communication data to be transmitted to the originating source of the multiple communication data by the route hub RH3 to the network output I/F 11;

path number rewriting and updating function for when receiving the use declaration of the new path number from the route hub RH2 positioned on the upper stream side via the network input I/F 7, rewriting and updating the maximum path number stored in the path information storage section 17 into a new path number; and an operation information extracting function for when receiving various instructions, the operation information of the functional equipments N or the communication data including source data from the route hub RH2 positioned on the upper stream side via the network input I/F 7, extracting the operation information of the various functional equipments N7, N8 and N9 connected with the route hub RH3 from the received operation information of the functional equipments N so as to transmit the extracted operation information to the operation control unit 21.

The equipment output I/F 19 has three first through third output ports P4, P5 and P6, and it inputs the communication data transmitted from the network output I/F 11, and performs a suitable converting process on the inputted communication data so as to distribute and output the converted communication data to the functional equipment N7 via the specified fourth output port P4 in the first through third output ports P4, P5 and P6.

Figure 4:
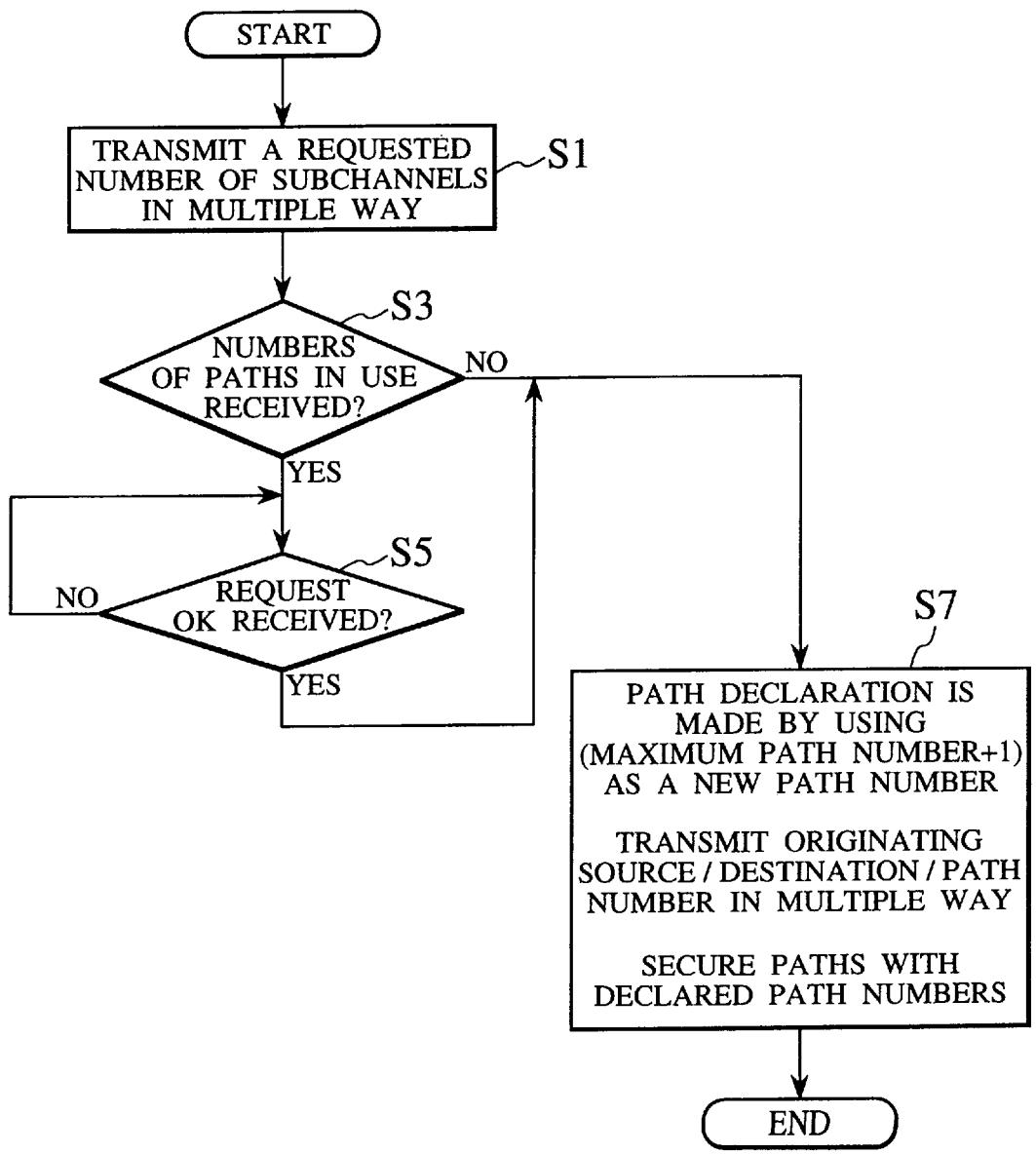
FIG. 4 is an operational flow chart of the route hub RH to be a main section of the communication system.
Figure 5:
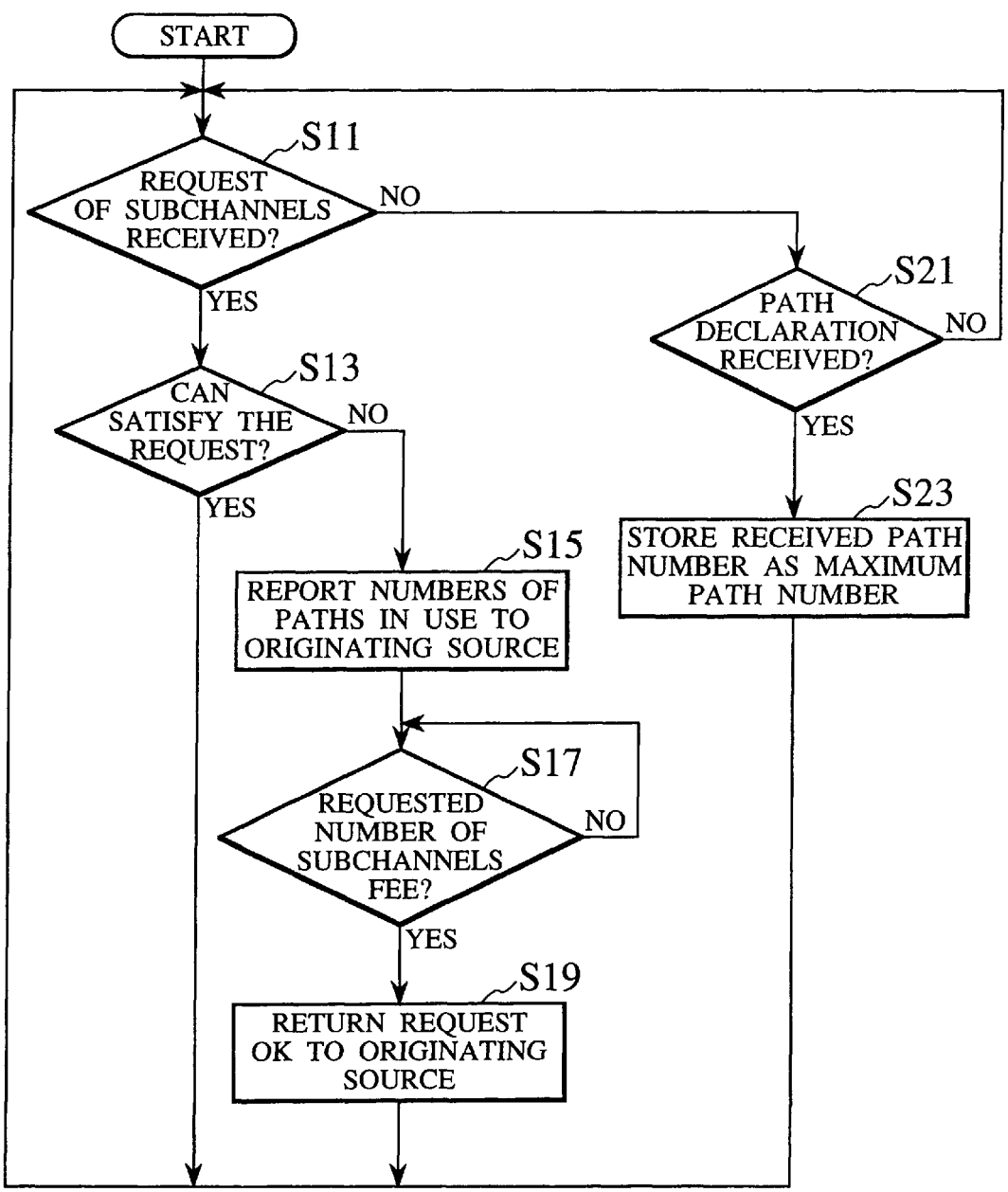
FIG. 5 is an operational flow chart of the route hub RH to be a main section of the communication system.

The operation of the respective route hubs RH is described by typically exemplifying the route hub RH3 on reference to the operation flow charts shown in FIGS. 4 and 5. The description refers to the case where the route hub RH3 or one of the functional equipments N8 and N9 to be an originating source node terminal in the various functional equipments N7, N8 and N9 connected with the route hub RH3 requests transmission of the communication data to a prescribed destination, namely, the route hub RH3 is a path request route hub RH, and the case where the other route hubs make path request.

First, the operation of the route hub RH3 is described by exemplifying the case where the route hub RH3 is a path request route hub RH.

As shown in FIG. 4, when the route hub RH3 or one of the functional equipments N8 and N9 to be an originating source node terminal in the various functional equipments N7, N8 and N9 connected with the route hub RH3 requests transmission of communication data to a prescribed destination, the path control section 15 transmits a number of request subchannels which are used occupationally by a group of communication data to be transmitted to the network output I/F 11, and accordingly the network output I/F 11 transmits a number of request subchannels in multiple way to all the route hubs RH existing in paths from the originating source to destination as multiple destination (Step S1).

Next, the path control section 15 judges as to whether or not it received self path information including numbers of paths in use from the multiple destination route hubs RH via the network input I/F 7 (Step S3). The multiple destination route hubs RH, which received a number of request subchannels from the path request route hub RH, as mentioned later, judges as to whether or not the route hubs RH themselves can prepare a requested number of subchannels, and as the result of the preparation YES/NO judgment, when the judgment is made that the route hubs RH themselves cannot prepare a requested number of subchannels, the self path information of the route hubs RH themselves is returned to the path request route hub RH. For this reason, a judgment can be made by the self path information reception judgment at S3 as to whether or not the route hubs RH in the multiple destination route hubs RH which can prepare a requested number of subchannels exist. Moreover, in the case where route hubs RH which cannot prepare a requested number of subchannels exist, all pieces of the self path information of the route hubs RH which cannot prepare a requested number of subchannels are obtained in the route hub RH3 as the path request route hub RH so that a condition that a requested number of subchannels cannot be prepared in the route hubs RH, namely, an insufficient number of subchannels, for example, can be grasped respectively.

As the result of the self path information reception judgment at S3, when receiving the self path information from the multiple destination route hubs RH, the path control section 15 judges as to whether or not it received the effect that the route hub RH which originates the self path information can prepare a requested number of subchannels, namely, judges as to whether or not the preparation for receiving the communication data is completed (Step S5), and repeats the judgment at S5 until the preparation for receiving the communication data is completed in all the multiple destination route hubs RH. The multiple destination route hubs RH, which returns the self path information to the path request route hub RH, as mentioned later, monitors as to whether or not a sufficient requested number of subchannels are free. When as a result of the monitoring of free channels, when a sufficient requested number of subchannels are free, the multiple destination route hubs RH returns the effect that the route hubs RH themselves can prepared a requested number of subchannels to the path request route hub RH, so according to the receiving preparation completion judgment at S5, the path request route hub RH can grasp as to whether or not the preparation for receiving the communication data in all the multiple destination route hubs RH is completed.

As the result of the judgment at S3 or S5, when the judgment is made that the preparation for receiving the communication data in all the multiple destination route hubs RH is completed, the path control section 15 transmits use declaration of a new path number, which are obtained by performing a prescribed operation on the maximum path number stored in the path information storage section 17, more specifically, for example, the new path number, which is obtained by increasing the maximum path number stored in the path information storage section 17 by "1", to the network output I/F 11, and accordingly the network output I/F 11 transmits the new path number use declaration to all the route hubs RH other than the multiple destination route hub in multiple way (Step S7). Here, the multiple destination route hubs RH which received the use declaration of the new path number from the path request route hub RH, as mentioned later, rewrites so as to update the maximum path number stored in the path information storage section 17 into the received new path number, and describes the new path number in a prescribed subchannel which is a free area at the time of the completion of the preparation for receiving. As a result, the path request route hub RH can secure new paths for the communication data from the originating source to destination. Moreover, the route hubs RH other than the multiple destinations, which received the new path umber use declaration from the path request route hub RH, rewrites so as to update the maximum path number stored in the path information storage section 17 into the received new path number.

The following describes the operation of the route hub RH3 by exemplifying the case where the route hub RH3 receives the path request from the route hubs RH other than the route hub RH3.

As shown in FIG. 5, first the path control section 15 judges as to whether or not it received a number of request subchannels when the route hub RH3 is multiple destinations from the path request,route hub RH (Step S11).

As the result of the reception YES/NO judgment at S11, when the judgment is made that the path control section 15 receives the number of request subchannels from the path request route hub RH, the path control section 15 refers to the received number of request subchannels and path state of the subchannels in the self path information stored in the path information storage section 15 so as to judge as to whether or not the route hub RH3 can prepare for a requested number of subchannels (Step S13).

As the result of the preparation YES/NO judgment at S13, when the judgment is made that the route hub RH3 cannot prepare a requested number of subchannels, the path control section 15 transmits the self path information including the numbers of paths in use to the network output I/F 11, and accordingly the network output I/F 11 returns the self path information to the path request route hub RH (Step S15). Here, the route hub RH3 can be arranged so as to return insufficient number of subchannels to the path request route hub RH, for example. Moreover, the route hub RH3 as multiple destination can be arranged so as to return the maximum path number in the numbers of paths in use to the path request route hub RH regardless of as to whether or not a requested number of subchannels can be prepared.

Next, the path control section 15 monitors as to whether or not a sufficient number of subchannels are free so as to judge as to whether or not the preparation for receiving the communication data is completed (Step S17) and repeats the preparation YES/NO judgment at S17 until a sufficient number of subchannels are free. Here, for example, after the path control section 15 controls free subchannels based on priority between plural groups of communication data currently occupying the subchannels of the route hub RH3 or waits for a prescribed time until a requested number of channels become free, the path control section 15 can make the preparation YES/NO judgment at S17.

As the result of the preparation YES/NO judgment at S17, when the judgment is made that the route hub RH3 can prepare for a requested number of subchannels, namely, the preparation for receiving the communication data is completed, the path control section 15 transmits the effect that the preparation for receiving the communication data is completed to the network output I/F 11, and accordingly the network output I/F 11 returns the effect that the preparation for receiving the communication data is completed to the path request route hub RH (Step S19).

Meanwhile, after the effect that the preparation for receiving the communication data is returned to the path request route hub RH, the path control section 15 makes a path declaration reception YES/NO judgment as to whether or not the path control section 15 received new path number use declaration from the path request route hub RH (Step S21), and repeats the path declaration reception YES/NO judgment at S21 until the path control section 15 receives the new path number use declaration.

As the result of the path declaration reception YES/NO judgment at S21, when the judgment is made that the new path number use declaration is received from the path request route hub RH, the path control section 15 rewrites so as to update the maximum path number stored in the path information storage section 17 into the received new path number, and describes the new path number in a prescribed subchannel as a free area at the time of the completion of the preparation for receiving (Step S23). As a result, the route hub RH3 can secure paths for communication data originated from the path request route hub RH.

Next, the description is given as to the path connected state between an originating source and destination of plural groups of communication data in the case where inherent path numbers are given in the order of paths being requested and the path state of subchannels in the respective route hubs RH in the path connected state in the communication system 1 of the present invention on reference to the state transition diagrams shown in FIGS. 7 through 12 and the path numbers provided in the order of paths being requested shown in FIG. 13. Here, for simplification, in FIGS. 7, 9 and 11, by giving circled numbers such as ①, ②, ③ . . . to plural paths, different communication paths can be discriminated from each other at a glance.

Figure 7:
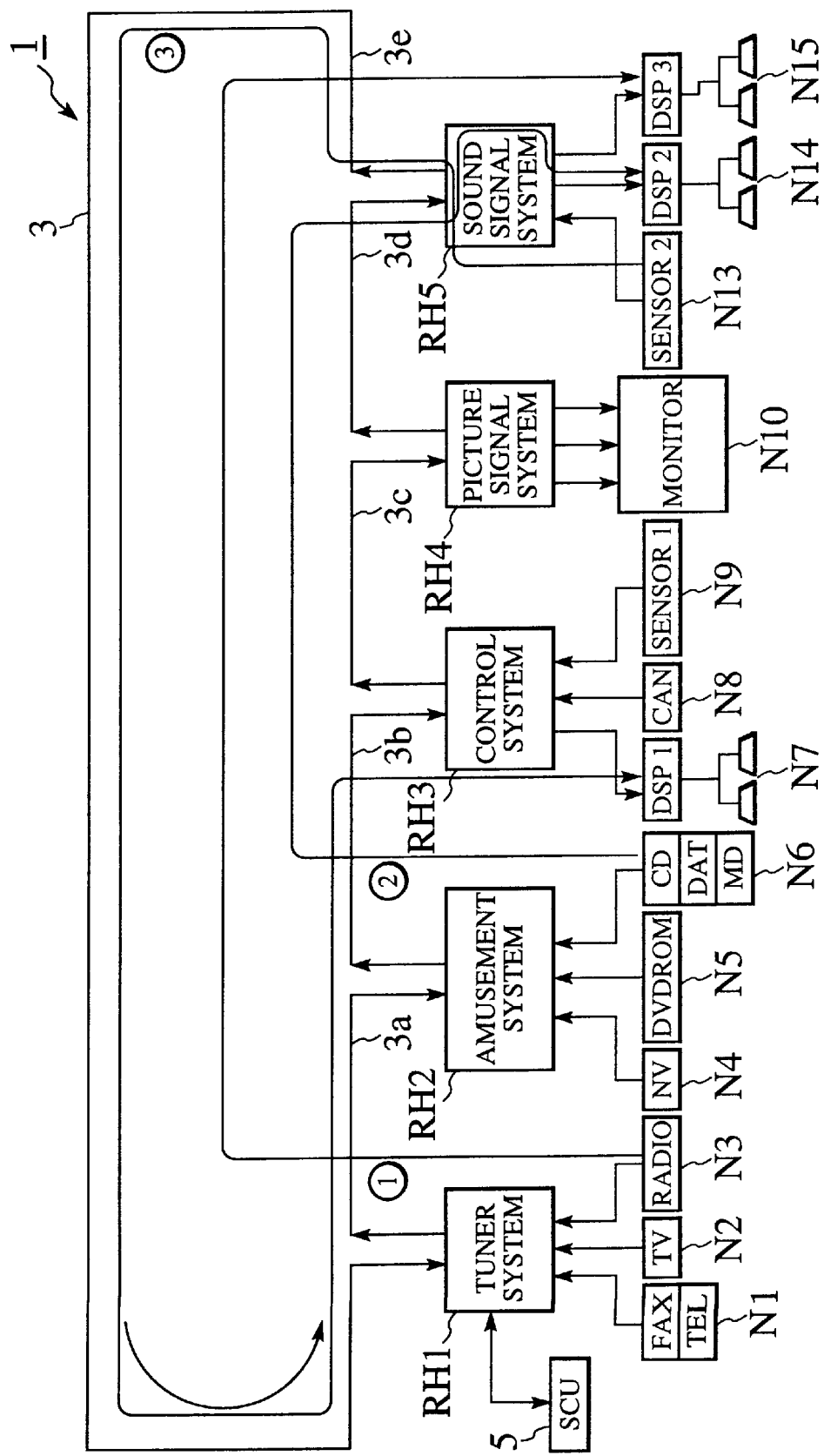
FIG. 7 is a state transition diagram showing a path connected state between the originating source and destination for plural groups of communication data and path state of subchannels in the respective route hubs RH in the path connected state.

First, in the example of FIG. 7, the plural path request route hubs RH1, RH2 and RH5 shown in FIG. 13 successively request paths for communication data, and the path numbers "1", "2" and "3" are given to the respective request paths.

For example, the description is given as to the procedure for securing paths by exemplifying the case where the route hub RH1 requests paths for communication data from the originating source functional equipment N3 to the destination functional equipment N15. First, the route hub RH1 specifies the route hubs RH2, RH3, RH4 and RH5 as multiple destinations, and transmits "6", for example, as a number of request subchannels to the multiple destinations in multiple way. Next, the route hub RH1 receives responses as to whether or not a requested number of subchannels can be prepared from all the multiple destinations, and judges as to whether or not preparation for the paths for communication data is completed in the respective multiple destinations based on the received result. When the preparation for the paths for communication data in all the multiple destinations is completed, the route hub RH1 transmits new path number use declaration, in which the new path number is an operation value "1" obtained by increasing a maximum path number initially set for "0" when the communication system 1 is powered on by a prescribed value such as "1", to the multiple destinations in multiple way. As a result, the path for communication data from the originating source functional equipment N3 to the destination functional equipment N15 is secured with use-declared new path number "1".

More specifically, as shown in FIG. 7, a path for communication data in which the functional equipment N3 (radio) connected with the route hub RH1 is an originating source and the functional equipment N15 (DSP3) connected with the route hub RH5 is a destination is secured with the path number ①. A path for communication data in which the functional equipment N6 (CD/DAT/MD) connected with the route hub RH2 is an originating source and the functional equipment N14 (DSP2) connected with the route hub RH5 is a destination is secured with the path number ②. A path for communication data in which the functional equipment N13 (sensor 2) connected with the route hub RH5 is an originating source and the functional equipment N7 (DSP1) connected with the route hub RH3 is a destination is secured with the path number ③.

FIG. 8 shows a list of the path state of subchannels in the respective route hubs RH corresponding to the path connected state shown in FIG. 7. In order to secure the path for communication data of path number ① which uses occupationally six subchannels, the path number "1" is described in the subchannels S1 through S6 on the transmission side (Tx) of the route hub RH1, and the path number "1" is described in the subchannels S1 through S6 on the receiving side (Rx) and transmission side (Tx) of the route hubs RH2, RH3 and RH4, and the path number "1" is described in the subchannels S1 through S6 on the receiving side (Rx) of the route hub RH5.

In addition, in order to secure paths for communication data of path number ② which use occupationally six subchannels, path number "2" is described in the subchannels S7 through S12 on the transmission side (Tx) of the route hub RH2, and path number "2" is described in the subchannels S7 through S12 on the receiving side (Rx) and transmission side (Tx) of the route hubs RH3 and RH4, and path number "2" is described in the subchannels S7 through S12 on the receiving side (Rx) of the route hub RH5.

Then, in order to secure a path for communication data with path number ③ which uses occupationally four subchannels, path number "3" is described in the subchannels S13 through S16 on the transmission side (Tx) of the route hub RH5, and path number "3" is described in the subchannels S13 through S16 on the receiving side (Rx) and transmission side (Rx) of the route hubs RH1 and RH2, and path number "3" is described in the subchannels S13 through S16 on the receiving side (Rx) of the route hub RH3.

In the example of FIG. 8, since plural groups of communication data are transmitted from the originating source to destination, the respective route hubs RH use occupationally subchannels with the the same number respectively for the plural groups of communication data.

Figure 9:
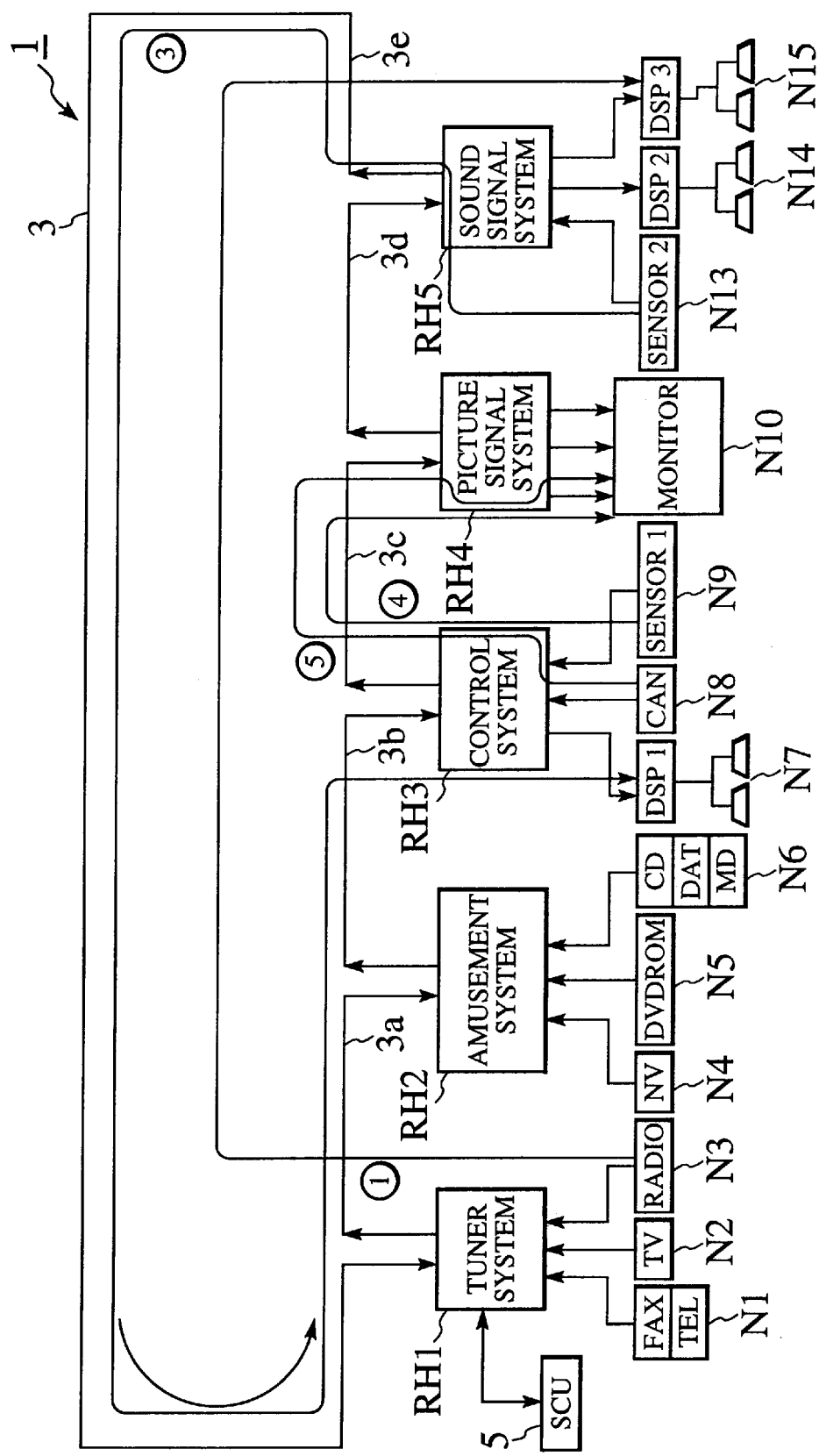
FIG. 9 is a state transition diagram showing a path connected state between the originating source and destination for plural groups of communication data and path state of subchannels in the respective route hubs RH in the path connected state.

In addition, in the example of FIG. 9, in the state that the communication corresponding to path number ② in the example of FIG. 7 is completed and the communication corresponding to path numbers ① and ③ is maintained, a path for communication data with path number ④, in which the functional equipment N9 (sensor 1) connected with the route hub RH3 is an originating source and the functional equipment N10 (monitor) connected with the route hub RH4 is a destination, is secured as a communication path for two systems newly generated. Moreover, a path for communication data with path number ⑤, in which the functional equipment N8 (CAN) connected with the route hub RH3 is an originating source and the functional equipment N10 (monitor) connected with the route hub RH4 is a destination, is secured.

FIG. 10 shows a list of the path state of the subchannels in the respective route hubs RH corresponding to the path connected state shown in FIG. 9. Here, the communication paths corresponding to the path numbers ① and ③ are held in that state, and the path state in FIG. 8 is held in the same state. Therefore, the description relating to the communication paths corresponding to the path numbers ① and ③ are omitted, and the description is given as to the path state of the subchannels in the respective route hubs RH for securing the communication path for two system newly generated.

First, in order to secure a path for communication data of path number ④ which uses occupationally four subchannels, path number "4" is described in the subchannels S13 through S16 on the transmission side (Tx) of the route hub RH3, and path number "4" is described in the subchannels S13 through S16 on the receiving side (Rx) of the route hub RH4.

Then, in order to secure a path for communication data of path number ⑤ which uses occupationally four subchannels, path number "4" is described in the subchannels S13 through S16 on the transmission side (Tx) of the route hub RH3, and path number "4" is described in the subchannels S13 through S16 on the receiving side (Rx) of the route hub RH4.

The example of FIG. 10 shows that the subchannels corresponding to path number ②, which become a free area after the communication is completed in the example of FIG. 7 are not used, and subchannels whose numbers are the same as the subchannels used occupationally by path number ③ and are a free area are used.

Figure 11:
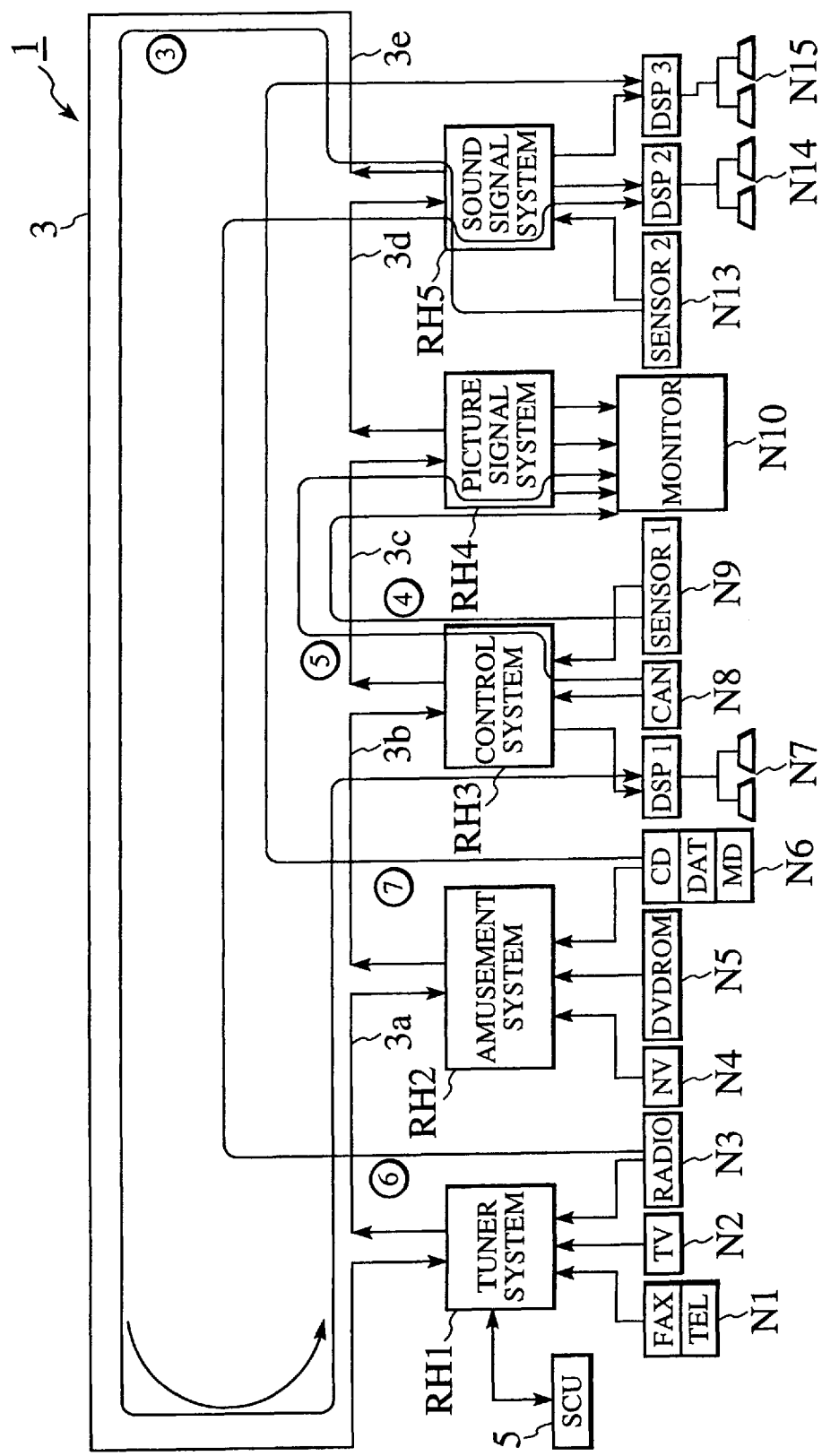
FIG. 11 is a state transition diagram showing a path connected state between the originating source and destination for plural groups of communication data and path state of subchannels in the respective route hubs RH in the path connected state.

Further, in the example of FIG. 11, in the state that the communication corresponding to path number ① in the example of FIG. 9 is completed and the communication corresponding to path numbers ③, ④ and ⑤ is maintained, a path for communication data of path number ⑥, in which the functional equipment N3 (radio) connected with the route hub RH1 is an originating source and the functional equipment N14 (DSP2) connected with the route hub RH5 is a destination, is secured as the communication path for two systems newly originated, and a path for communication data with path number ⑥, in which the functional equipment N6 (CD/DAT/MD) connected with the route hub RH2 is an originating source and the functional equipment N15 (DSP3) connected with the route hub RH5 is a destination, is secured.

FIG. 12 shows a list of the path state of the subchannels in the respective route hubs RH corresponding to the path connected state shown in FIG. 11. Here, the communication paths corresponding path numbers ③, ④ and ⑤ are held intact, and the path state of FIG. 10 is kept in the same state. Therefore, the description relating to the communication paths corresponding to path numbers ③, ④ and ⑤ is omitted, and the description is given as to the path state of the subchannels in the respective route hubs RH for securing communication paths ⑥ and ⑦ for two systems newly generated.

First, in order to secure a path for communication data of path number ⑥ which uses occupationally six subchannels, path number "6" is described in the subchannels S1 through S6 on the transmission side (Tx) of the route hub RH1, and path number "6" is described in the subchannels S1 through S6 on the receiving side (Rx) and transmission side (Tx) of the route hubs RH2, RH3 and RH4, and path number "6" is described in the subchannels S1 through S6 on the receiving side (Rx) of the route hub RH5.

Then, in order to secure a path for communication data of path number ⑦ which uses occupationally six subchannels, path number "7" is described in the subchannels S7 through S12 on the transmission side (Tx) of the route hub RH2, and path number "7" is described in the subchannels S7 through S12 on the receiving side (Rx) and transmission side (Tx) of the route hubs RH3 and RH4, and path number "7" is described in the subchannels S7 through S12 on the receiving side (Rx) of the route hub RH5.

The example of FIG. 12 shows that the subchannels S1 through S12, which become a free area after the communication in the example of FIG. 7 or 9 is completed, are used by the communication paths ⑥ and ⑦ for two systems newly originated.

Here, in the present embodiment, the multiple destination route hubs RH, which received a number of request subchannels from the path request route hub RH and received the path number use declaration, can respectively refer to the path state of their subchannels so as to describe path numbers declared to be used in a free area of arbitrary subchannels. Namely, the multiple destination route hubs RH can make the path management therein individually and dispersively.

As mentioned above, according to the communication system 1 of the present invention, path request route hub RH, which makes path request, first transmits a number of request subchannels to multiple destinations which are route hubs RH existing in paths from the originating source to destination. Next, the path request route hub RH receives responses as to whether or not a requested number of subchannels can be prepared from all the multiple destinations, and judges as to whether or not the preparation for paths for communication data is completed in the respective multiple destinations based on the received results. When the preparation for paths for communication data in all the multiple destinations is completed, the path request route hub RH transmits in multiple way new path number use declaration, in which a new path number is an operation value obtained by increasing the maximum path number stored in the path information storage section 17 by a prescribed number such as "1", to all the route hubs RH other than the multiple destinations. As a result, the paths for communication data from the originating source to destination with new path number can be secured.

In addition, according to the communication system of the present invention, the path request route hub, which makes path request, transmits a number of request subchannels to multiple destinations which are route hubs RH existing from the originating source to destination in multiple way, whereas the route hubs RH as the multiple destinations makes communication path management individually and dispersively so as to obtain a requested number of subchannels. Therefore, processing load due to the path management in the respective route hubs RH is reduced, and processing time required for the path management in the route hubs RH is shortened. As a result, even in the case where data are exchanged between the functional equipments belonging respectively to different route hubs RH, for example, communication data can be transmitted securely from the originating source to destination without lowering a data transmission amount per unit time.

Further, according to the communication system of the present invention, the path request route hub RH, which makes path request, secures communication paths from originating source to destination, and path numbers, which are eigenvalues for individual communication data originated from the same source are given, are given to the obtained communication paths in order to discriminate the communication data originated from different sources from each other. Therefore, transferring, starting-up, stopping, etc. per communication path are simplified, and as a result, easiness and expandability of the path management can be improved greatly.

Furthermore, according to the communication system of the present invention, the path request route hub RH, which makes path request, transmits in multiple way a number of request channels to multiple destinations which are route hubs RH existing from originating source to destination, whereas the respective multiple destination route hubs RH makes the communication path management individually and dispersively in order to obtain a requested number of subchannels, but in the case where a requested number of subchannels cannot be prepared, an insufficient number of channels and or self path information is returns to the path request route hub RH. Therefore, the path request route hub RH can grasp the state that a requested number of subchannels cannot be prepared in each multiple destination route hub RH.

Further, according to the communication system of the present invention, the plural route hubs RH can respectively perform the dispersed path management, and when transmitting the effect that plural sets of communication paths are switched simultaneously to multiple destinations, the plural sets of communication paths can be switched simultaneously. As a result, the central path management can be made simply similarly to the dispersive path management.

The detailed description was given as mentioned above, but the present invention is not limited to the aforementioned embodiment, so it is needless to say that the present invention can be applied to another embodiments which are modified suitably within the scope of the claims.

Namely, for example, in the present embodiment, inherent path numbers are given to the paths for communication data originating from different sources so that these paths can be discriminated from each other. However, in another way, by giving sub numbers such as ③-1, ③-2 . . . to subchannels, the order of subchannel to be used can be changed and controlled arbitrarily.

In addition, in the present embodiment, in order to transmit plural groups of communication data from an originating source to destination, the respective route hubs RH occupies subchannels with the same numbers corresponding to the respective groups of communication data. However, the present invention is not limited to this embodiment, so in order to plural groups of communication data from the originating source to destination, the present invention can be also applied to embodiment such that the respective route hubs RH successively occupy subchannels with different numbers for respective groups of communication data in such a manner that the subchannels are occupied starting from a left part of free area.

In the end, according to the communication system of the present invention, when the respective repeating installations perform connecting process between channels between the node terminals connected respectively to the repeating installations, it is needless to say that data can be exchanged between the node terminals connected respectively to the repeating installations.

What is claimed is:

1. A communication method which is used in a communication system arranged by connecting plural repeating installations, to which one or more node terminals are connected, via a data transmission line, when data are exchanged between the node terminals, between the repeating installations or between the node terminals and repeating installations, said communication method comprising the steps of:

providing the plural repeating installations with plural subchannels which become paths for communication data received/transmitted from/to the respective repeating installations and path information storage circuit for storing path information relating to paths from an originating source to destination per subchannel;

transmitting, from a repeating installation in the plural repeating installations, which becomes a path request repeating installation when request of transmission of communication data is made to a prescribed destination in one of the repeating installation itself or a node terminal connected with the repeating installation itself, a number of request subchannels which are used occupationally by the communication data to be transmitted to all multiple destination repeating installations existing in paths from the originating source to destination in multiple way; and referring, in the respective multiple destination repeating installations which received the number of request subchannels from the path request repeating installation, to the received number of request subchannels and the path information stored in the path information storage circuit to manage respective communication paths respectively.

2. A communication method according to claim 1, further comprising the steps of:

judging, in the respective multiple destination repeating installations which received the number of request subchannels from the path request repeating installation, as to whether or not a requested number of subchannels can be prepared with referring to the received number of request subchannels and the path information stored in the path information storage circuit; and returning a result of a preparation YES/NO judgment from the respective multiple destination repeating installations to the path request repeating installation.

3. A communication method according to claim 1, further comprising the steps of:

judging, in the respective multiple destination repeating installations which received the number of request subchannels from the path request repeating installation, as to whether or not a requested number of subchannels can be prepared with referring to the received number of request subchannels and the path information stored in the path information storage circuit; and returning a state that subchannels cannot be prepared to the path request repeating installation when a judgment is made that a requested number of subchannels cannot be prepared as a result of the preparation YES/NO judgment.

4. A communication method which is used in a communication system arranged by connecting plural repeating installations, to which one or more node terminals are connected, via a data transmission line, when data are exchanged between the node terminals, between the repeating installations or between the node terminals and repeating installations, the communication method comprising the steps of:

providing the plural repeating installations with plural subchannels which become paths for communication data received/transmitted from/to the respective repeating installations, and path information storage circuit for storing path information which comprises use/free state of the subchannels, path numbers to which eigenvalues are given for communication data whose sources are the same in order to be able to discriminate communication data whose sources are different from each other and maximum path number which is one of the path numbers in use in the communication system obtains a maximum value;

transmitting, from a repeating installation in the plural repeating installations, which becomes a path request repeating installation when request of transmission of communication data is made to a prescribed destination in one of the repeating installation itself or a node terminal connected with the repeating installation itself, a number of request subchannels which are used occupationally by the communication data to be transmitted to all multiple destination repeating installations existing in paths from an originating source to destination in multiple way;

judging, in the respective multiple destination repeating installations which received the number of request subchannels from the path request repeating installation, as to whether or not the requested number of subchannels can be prepared with referring to the received number of request subchannels and the path information stored in the path information storage circuit;

returning an effect that the preparation for receiving the communication data is completed to the path request repeating installation when a judgment is made that the requested number of subchannels can be prepared as a result of a preparation YES/NO judgment; and transmitting, from the path request repeating installation which received an effect that a preparation for receiving the communication data is completed from all the multiple destination repeating installations, declaration to use a new path number obtained by performing prescribed operation on a maximum path number stored in the path information storage circuit to at least all the multiple destination repeating installations in multiple way.

5. A communication method according to claim 4, further comprising the step of:

rewriting and updating, in the respective multiple destination repeating installations which received a new path number use declaration from the path request repeating installation, a maximum path number stored in the path information storage circuit into the received new path number.

6. A communication system comprising plural repeating installations, to which one or more node terminals are connected, connected via a data transmission line, said communication system exchanging data between the node terminals, between the repeating installations or between the node terminals and repeating installations, said plural repeating installations comprising:

plural subchannels which become paths for communication data received/transmitted from/to the respective repeating installations; and a path information storage circuit for storing path information relating to paths from an originating source to destination per subchannel;

a repeating installation in said plural repeating installations, which becomes a path request repeating installation when request of transmission of communication data is made to a prescribed destination in one of the repeating installation itself or a node terminal connected with the repeating installation itself: comprising a request subchannel number multiple transmission circuit for transmitting a number of request subchannels which are used occupationally by the communication data to be transmitted to all multiple destination repeating installations existing in paths from an originating source to destination in multiple way;

said respective multiple destination repeating installations which received the number of request subchannels from the path request repeating installation: comprising a path control circuit for referring to the received number of request subchannels and the path information stored in the path information storage circuit so as to manage respective communication paths respectively.

7. A communication system according to claim 6, wherein said path control circuit judges as to whether or not the requested number of subchannels can be prepared with referring to the received number of request subchannels and path information stored in the path information storage circuit, and returns a result of a preparation YES/NO judgment to the path request repeating installation.

8. A communication system according to claim 6, wherein the path control circuit judges as to whether or not the requested number of subchannels can be prepared with referring to the received number of request subchannels and path information stored in the path information storage circuit, and returns a preparation impossible condition to the path request repeating installation when a judgment is made that the requested number of subchannels cannot be prepared as a result of a preparation YES/NO judgment.

9. A communication system comprising plural repeating installations, to which one or more node terminals are connected, connected via a data transmission line, said communication system exchanging data between the node terminals, between the repeating installations or between the node terminals and repeating installations, said plural repeating installations comprising:

plural subchannels which become paths for communication data received/transmitted from/to the respective repeating installations; and a path information storage circuit for storing path information which comprises use/free state of the subchannels, path numbers to which eigenvalues are given for communication data whose sources are the same in order to be able to discriminate communication data whose sources are different from each other and maximum path number which is one of the path numbers in use in the communication system obtains a maximum value;

a repeating installation in said plural repeating installations, which becomes a path request repeating installation when request of transmission of communication data is made to a prescribed destination in one of the repeating installation itself or a node terminal connected with the repeating installation itself: comprising a request subchannel number multiple transmission circuit for transmitting a number of request subchannels which are used occupationally by the communication data to be transmitted to all multiple destination repeating installations existing in paths from an originating source to destination in multiple way;

said respective multiple destination repeating installations which received the number of request subchannels from the path request repeating installation, comprising:

a path control circuit for referring to the received number of request subchannels and the path information stored in the path information storage circuit so as to judge as to whether or not the requested number of subchannels can be prepared and when the judgment is made that the requested number of subchannels can be prepared as a result of a prepa ration YES/NO judgment, returning the effect that the preparation for receiving the communication data is completed to the path request repeating installation;

said path request repeating installation which received an effect that a preparation for receiving the communication data is completed from all the multiple destination repeating installations, comprising:

a use declaration multiple transmission circuit for transmitting declaration to use a new path number obtained by performing prescribed operation on a maximum path number stored in the path information storage circuit to at least all the multiple destination repeating installations in multiple way.

10. The communication system according to claim 9, wherein the multiple destination repeating installations which received the new path number use declaration from the path request repeating installation, comprises a path number rewriting/updating circuit for rewriting and updating a maximum path number stored in the path information storage circuit into the received new path number.

* * * * *